(12) United States Patent
Choudhary et al.

(10) Patent No.: US 12,197,323 B2
(45) Date of Patent: Jan. 14, 2025

(54) DATA STORAGE DEVICE WITH BALANCED BACKGROUND OPERATIONS AND METHOD THEREFOR

(71) Applicant: Western Digital Technologies, Inc., San Jose, CA (US)

(72) Inventors: Anamika Choudhary, New Delhi (IN); Ramkumar Ramamurthy, Bangalore (IN); Narendhiran Chinnaanangur Ravimohan, Bangalore (IN); Lovish Singla, Bangalore (IN); Meenakshi C, Bangalore (IN); Bhagyashankar Muthu Kumaresan, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/225,789

(22) Filed: Jul. 25, 2023

(65) Prior Publication Data

US 2024/0411688 A1 Dec. 12, 2024

Related U.S. Application Data

(60) Provisional application No. 63/472,403, filed on Jun. 12, 2023.

(51) Int. Cl.
*G06F 12/02* (2006.01)
(52) U.S. Cl.
CPC ...... *G06F 12/0253* (2013.01); *G06F 12/0246* (2013.01)

(58) Field of Classification Search
CPC .................. G06F 12/0246; G06F 12/0253
See application file for complete search history.

(56) References Cited

U.S. PATENT DOCUMENTS

| | | | | |
|---|---|---|---|---|
| 7,392,269 | B2* | 6/2008 | Chauvel | G06F 12/0804 |
| | | | | 711/170 |
| 2007/0033330 | A1* | 2/2007 | Sinclair | G06F 3/0608 |
| | | | | 711/E12.008 |
| 2013/0097210 | A1* | 4/2013 | Amit | G06F 3/0652 |
| | | | | 707/813 |
| 2015/0347025 | A1* | 12/2015 | Law | G06F 3/061 |
| | | | | 711/103 |
| 2017/0212678 | A1* | 7/2017 | Blount | G06F 3/067 |
| 2018/0196745 | A1* | 7/2018 | Karr | G06F 16/1727 |
| 2020/0401513 | A1* | 12/2020 | He | G06F 12/0253 |
| 2021/0109855 | A1* | 4/2021 | Watt | G06F 12/0253 |

* cited by examiner

*Primary Examiner* — Aracelis Ruiz
(74) *Attorney, Agent, or Firm* — Crowell & Moring LLP

(57) ABSTRACT

In solid state memory devices, garbage collection can be a bottleneck in meeting stringent performance requirements of certain hosts that generate a relatively-large amount of data (e.g., hosts that generate video data). With such hosts, the performance drop caused by background garbage collection can result in video recording failures. The memory device and method presented herein performs background operations in such a way as to enhance sustained performance. In general, a counter is maintained that reflects an amount of memory written to by a host, as well as an amount of memory freed by garbage collection operations. Each step of a garbage collection operation can be performed in response to a value of the counter being greater than a threshold for the step such that there is a balance between memory written and memory freed.

20 Claims, 11 Drawing Sheets

Host Write Block

GC destination

GC sources (50% VFC)

GC sources (50% VFC)

Host Write Block

GC sources (0% VFC)

Host Write Block

GC sources (0% VFC)

DATA STORAGE DEVICE WITH BALANCED BACKGROUND OPERATIONS AND METHOD THEREFOR

CROSS-REFERENCE TO RELATED APPLICATION

This application claims priority to U.S. provisional patent application No. 63/472,403, filed Jun. 12, 2023, which is hereby incorporated by reference.

BACKGROUND

As the Flash industry is evolving in terms of capacities and memory configurations, background operations and garbage collection in particular can be a bottleneck in meeting stringent performance requirements of certain hosts that generate a relatively-large amount of data (e.g., hosts that generate video data). With such hosts, the performance drop caused by background garbage collection can result in video recording failures.

DETAILED DESCRIPTION

The following embodiments generally relate to a data storage device and method for performing background operations to enhance sustained performance. In one embodiment, a data storage device is provided comprising a memory and a controller coupled with the memory. The controller is configured to: maintain a counter by incrementing the counter by an amount of the memory written to by a host and decrementing the counter by an amount of the memory freed by garbage collection operations; and for each step of a garbage collection operation, perform the step in response to a value of the counter being greater than a threshold for the step.

In another embodiment, a method is provided that is performed in a data storage device comprising a memory. The method comprises: incrementing a balancing counter by an amount of the memory written to by a host; decrementing the balancing counter by an amount of the memory freed by garbage collection operations; and for each step of a garbage collection operation, performing the step in response to a value of the balancing counter being greater than a threshold for the step.

In yet another embodiment, a data storage device is provided comprising: a memory; means for maintaining a counter by incrementing the counter by an amount of the memory written to by a host and decrementing the counter by an amount of the memory freed by garbage collection operations; and means for performing each step of a garbage collection operation in response to a value of the counter being greater than a threshold for the step.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1A:
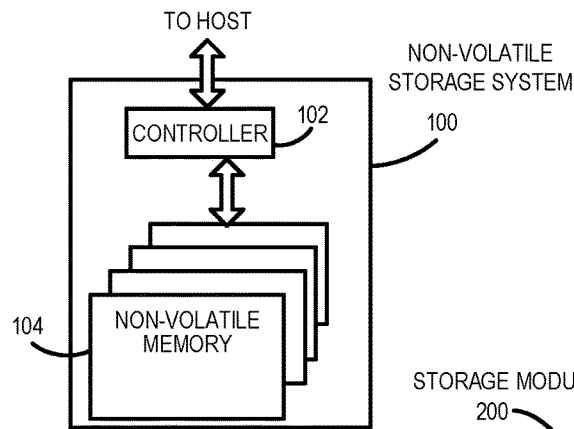
FIG. 1A is a block diagram of a data storage device of an embodiment.
Figure 1B:
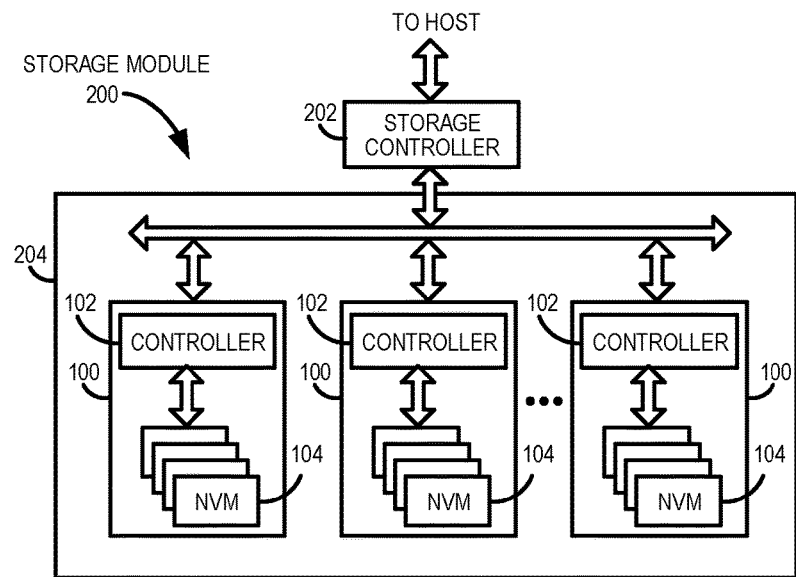
FIG. 1B is a block diagram illustrating a storage module of an embodiment.
Figure 1C:
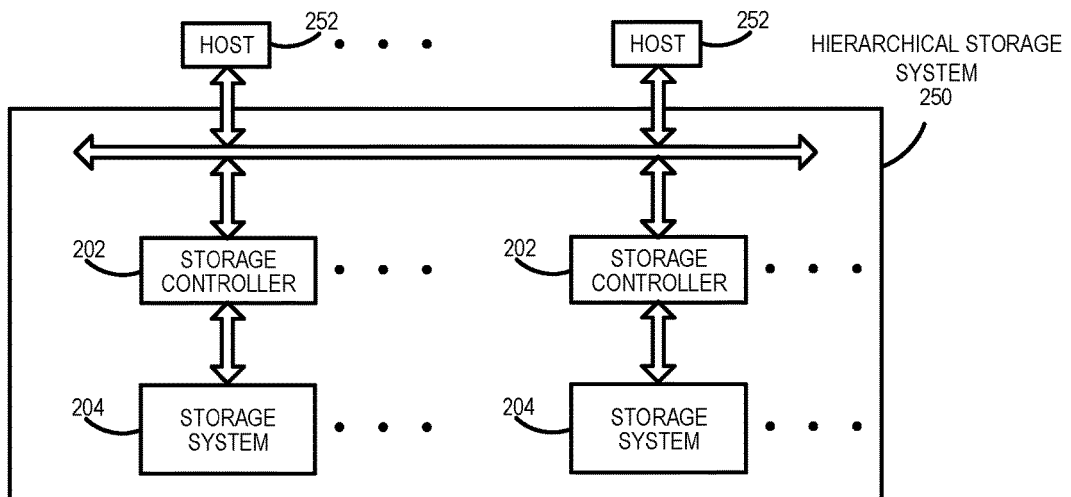
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
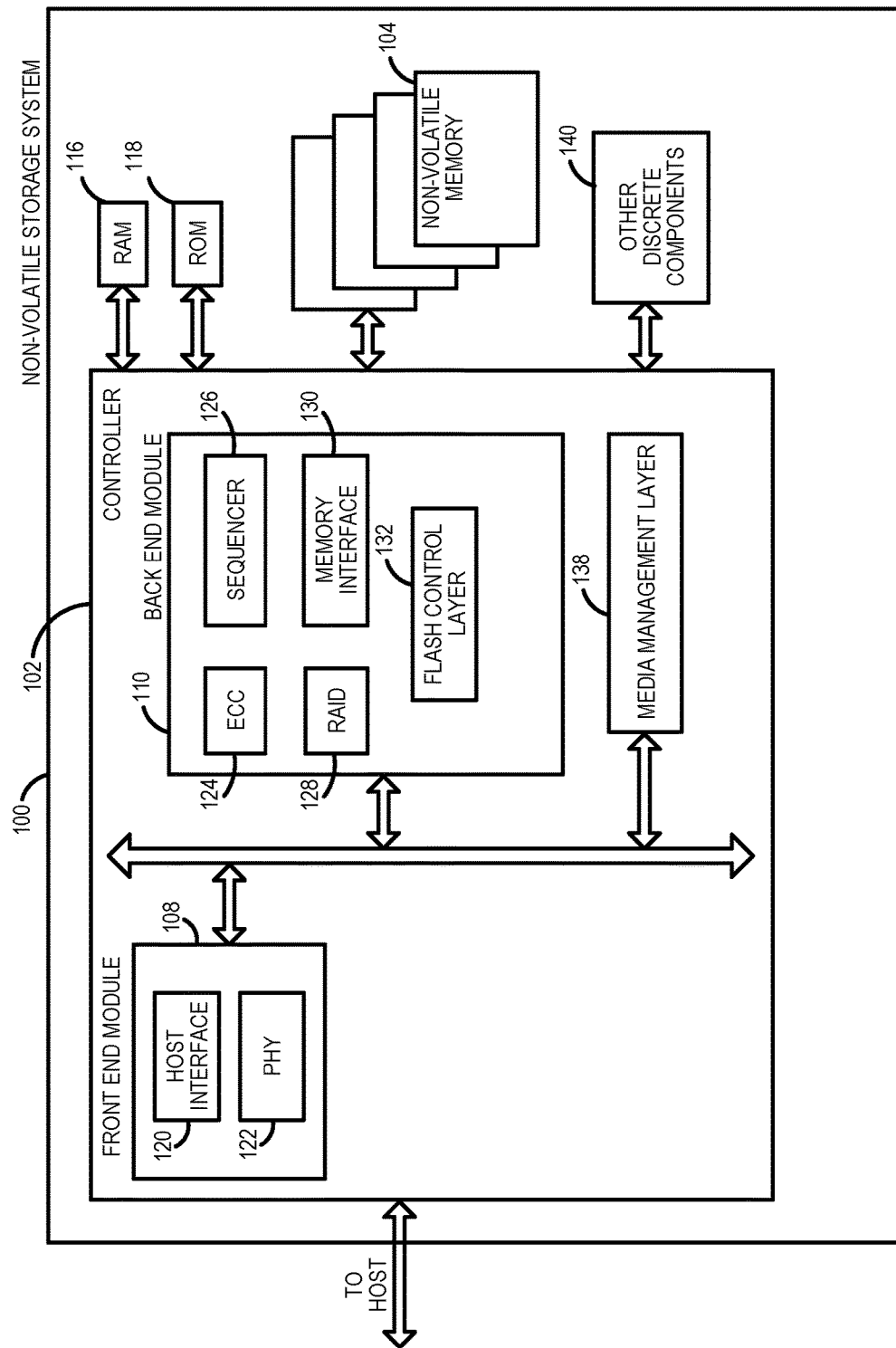
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
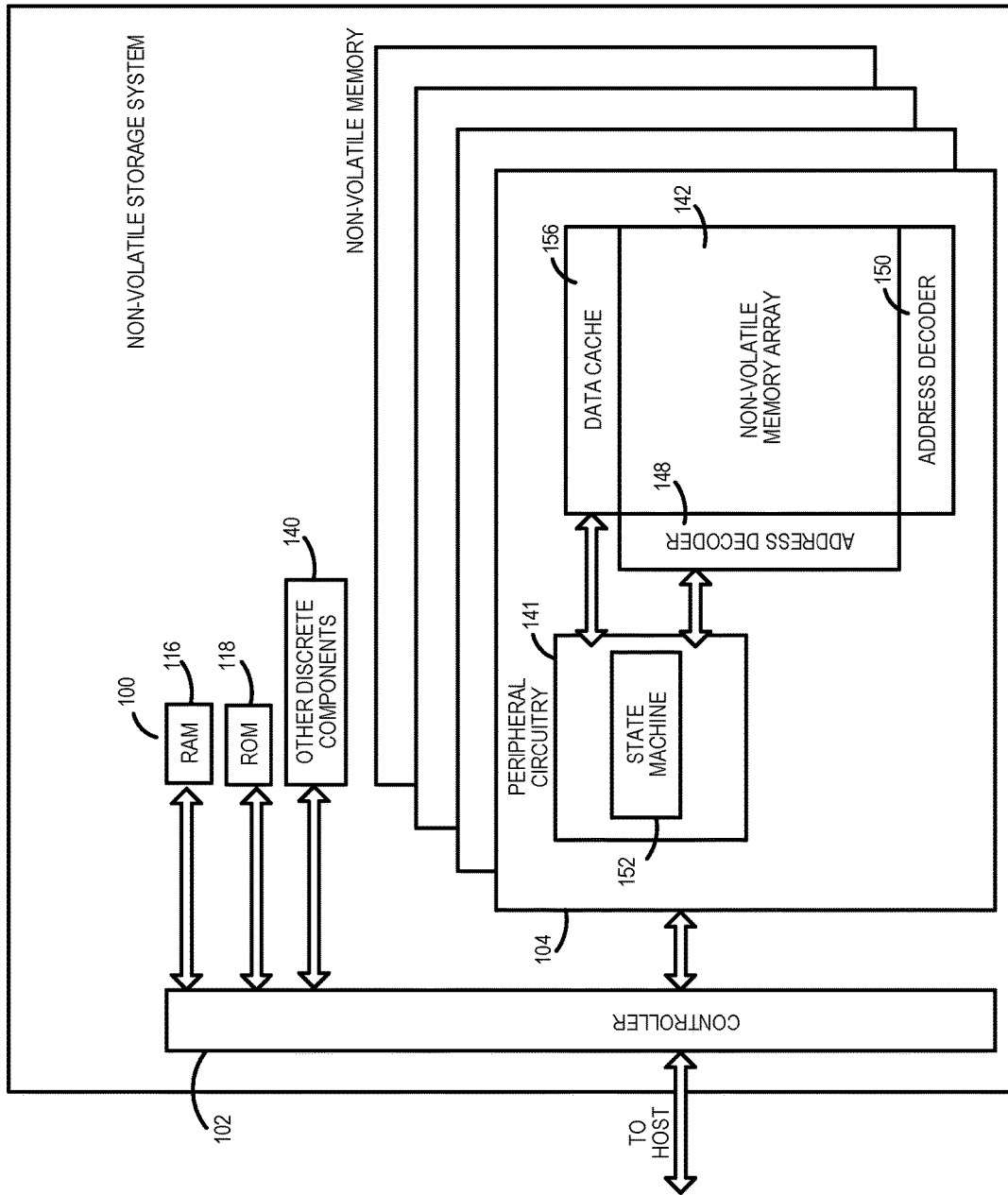
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
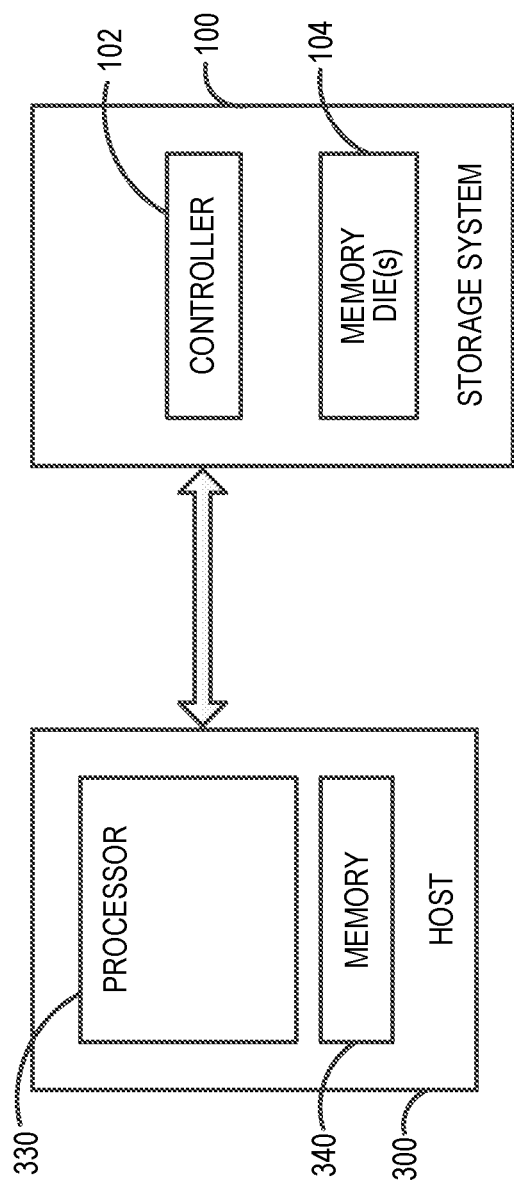
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, as the Flash industry is evolving in terms of capacities and memory configurations, garbage collection can be a bottleneck in meeting stringent performance requirements of certain hosts that generate a relatively-large amount of data (e.g., hosts that generate video footage). With such hosts, the performance drop caused by background garbage collection can result in video recording failures. Garbage collection typically involves the following steps: scanning for valid fragments in a source block, copying the valid fragments to a destination block, verifying that the valid fragments were copied successfully to the destination block (e.g., performing an enhanced post-write read (EPWR) operation on the destination block), and updating a logical-to-physical address map (e.g., in a global address table (GAT)) to reflect that new physical addresses in the memory that stores the copied valid fragments.

Some data storage devices are required to complete a host write in a certain amount of time (e.g., 250 milliseconds (ms)). During that time, the controller in the data storage device can allocate a first portion of the time (e.g., 150 ms) to carry out different garbage collection operations. Each step in the garbage collection operation can be split based on an available garbage collection quota (e.g., 150 ms). Due to this, all the steps in garbage collection operation may not be completely balanced. Further, as the block size keeps increasing, there can be a requirement to balance internal garbage collection operations with respect to the incoming host writes such that sustained performance is maintained throughout.

The following embodiments can be used to address this situation. In one embodiment, the controller 102 of the data storage device 100 is configured to perform garbage collection operation with respect to an amount of data in an incoming host write such that the number of blocks of stored data that is freed during the garbage collection operation is equal to the number of blocks of memory needed to store the data of the incoming host write (e.g., the number of blocks consumed by the incoming host write). These embodiments can be implemented in any suitable way. The following paragraphs provide an example of one such implementation. It should be understood that this is merely an example and that other implementations can be used. As such, none of the details presented herein should be read into the claims unless expressly recited therein.

In one example, the controller 102 is configured to use an entry criterion to start the garbage collection operation. In this example, when a free blocks list (FBL) falls below a certain (e.g., configurable) garbage collection threshold (e.g., 15), the controller 102 can start a background garbage collection operation. The controller 102 can select a block with the least valid fragment count (VFC) as the source block and then relocate only the valid data from that block to a new destination block. The controller 102 can also set a balancing flag to "true" and maintain a balancing counter, which it incremented by the sectors written by the host 300.

Each step in the garbage collection operation (e.g., the relocation of valid data, EPWR, and GAT commit) can be performed if the balancing counter crosses a calculated weightage based on the source block's VFC and the incoming write length of the host data, as represented by the following formula:

$$\text{Num Sectors To Compact} = \frac{\text{Src VFC}}{(\text{Max VFC} - \text{Src VFC})} \times \text{Host Write Count}$$

where Max VFC is 100% of the block size, Source VFC is the amount of valid data in the source block in fragments (e.g., 4 KB), and Host Write Counter is the indicator of the host sectors written with pending garbage collection. Here, the denominator is taken as (max VFC-source VFC), instead of just source VFC, to account for all the data being programmed to the memory 104 (i.e., host writes plus garbage-collection-relocated valid fragments).

The following is an example use of this formula. Here, Block A is selected as the source block for garbage collection with a 20% VFC. According to the above equation, the threshold would be calculated as:

$$\text{Num Sectors to compact} = \frac{20\%}{(100\% - 20\%)} \times \text{Host Write Count} = 1/4 \times \text{host write count}.$$

this case, for every four units (e.g., metapages) of data of a (e.g., TLC) host write, one unit of data (e.g., metapage) of garbage collection can be done in one phase.

Figure 4:
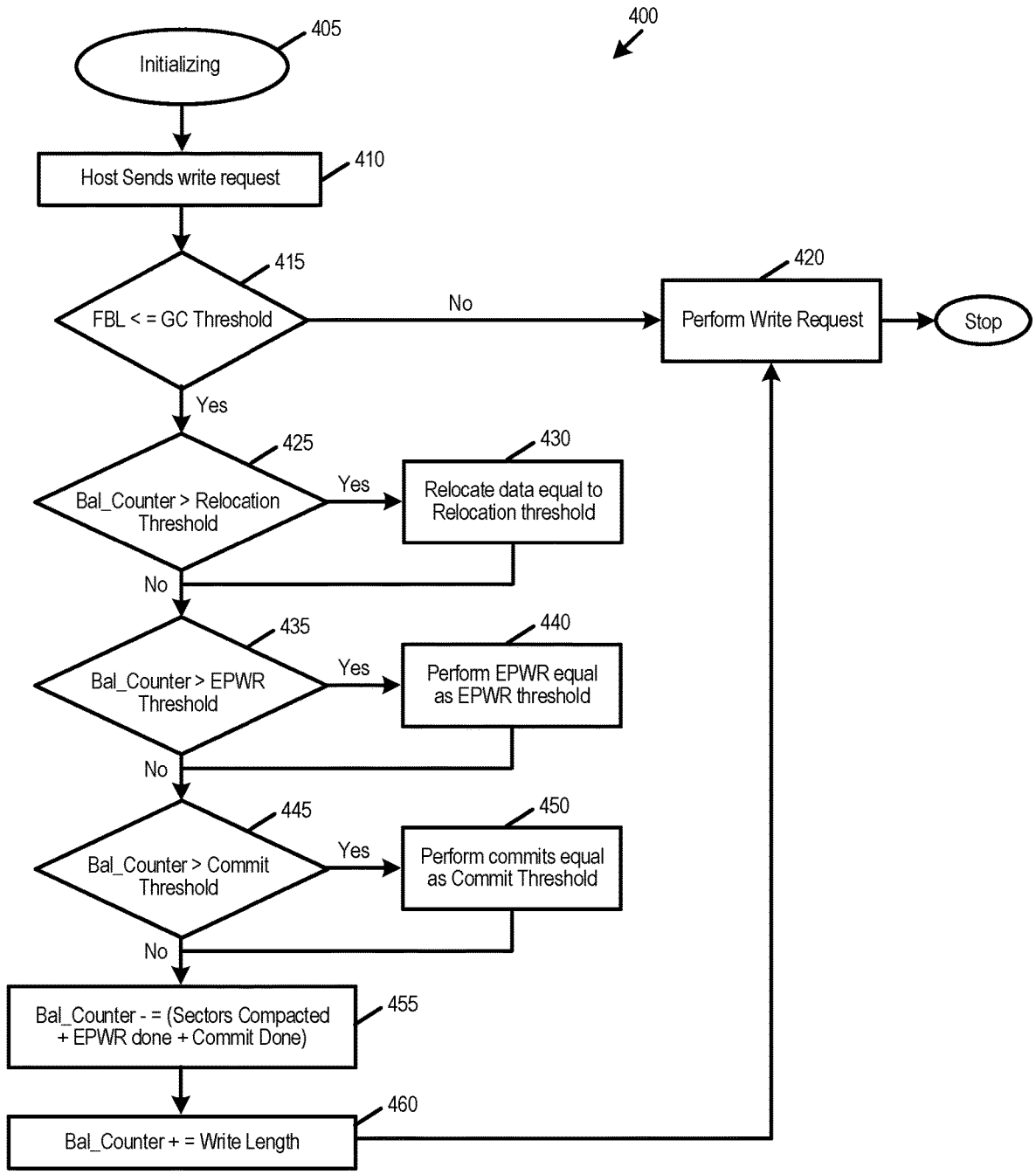
FIG. 4 is a flow chart of a method of an embodiment for performing background operations to enhance sustained performance.

FIG. 4 is a flow chart 400 that illustrates this process in more detail. As shown in FIG. 4, after an initialization phase (act 405), the host 300 sends a write request to the data storage device 100 (act 410). The controller 102 in the data storage device 100 then determines if the free block list (FBL) is less than or equal to the garbage collection threshold (act 415). If the FBL is not less than or equal to the garbage collection threshold, the controller 102 performs the write request (act 420). However, if the FBL is less than or equal to the garbage collection threshold, the controller 102 determines if the balance counter is greater than the relocation threshold (act 425). If the balance counter is greater than the relocation threshold, the controller 102 relocates an amount of data equal to the relocation threshold (act 430). Then (or if the balance counter is not greater than the relocation threshold), the controller 102 determines if the balance counter is greater than an EPWR threshold (act 435). If the balance counter is greater than an EPWR threshold, the controller 102 performs an amount of EPWR equal to the EPWR threshold (act 440). Then (or if the balance counter is not greater than an EPWR threshold), the controller 102 determines if the balance counter is greater than the commit threshold (act 445). If the balance counter is greater than the commit threshold, the controller commits an amount of data equal to the commit threshold (act 450). Then (or if the balance counter is not greater than the commit threshold), the controller 102 decreases the balance counter by the garbage collection that was performed (act 455) and increases the balance counter by the host write length (act 460). The controller 102 then performs the write request (act 420).

Figure 5:
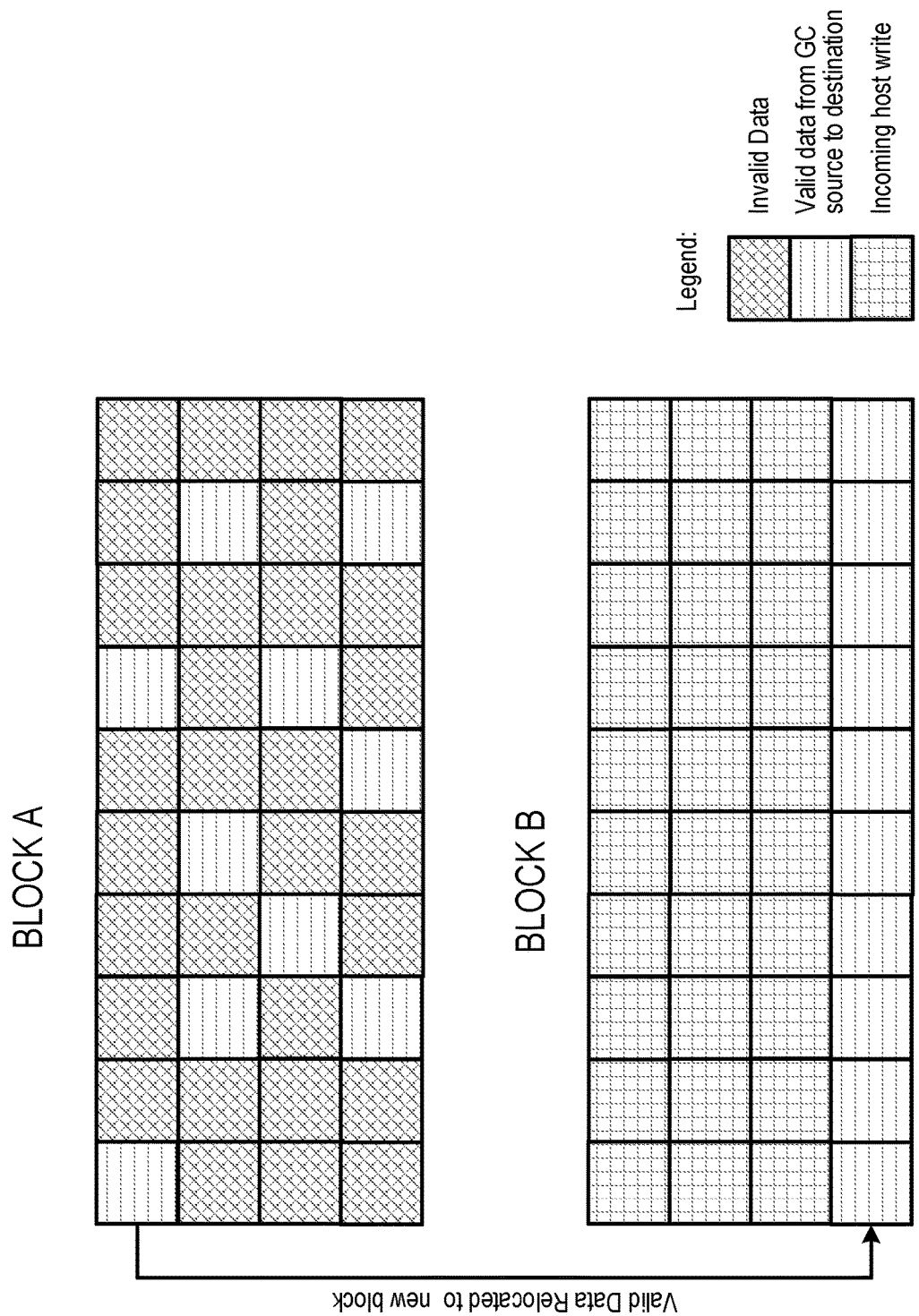
FIG. 5 is an illustration of an embodiment where valid data is relocated to a new block.

The illustrations in FIGS. 5-10 will now be described as an example of the embodiment discussed above. As shown in FIG. 5, when valid data from garbage collection source block A is relocated completely to block B, the controller 102 can free block A. The number of blocks freed during garbage collection equals the number of blocks consumed (relocation plus host writes).

The controller 102 can assign weightage to different garbage collection operations (e.g., relocation (scan/copy), EPWR, and commit) based on the block size and memory configuration. The weightage can be provided as a numerator and a denominator in configuration files used by the controller 102. In one embodiment, a direct write scheme is followed, wherein data is directly programmed to multi-level cell (MLC) blocks (e.g., with a block size of ~38 MB), with a backup written in a single-level cell (SLC) block. During garbage collection, a few MLC blocks are relocated to one new MLC destination block. The controller 102 can release source blocks only when the destination EPWR and GAT commits are successful.

Figure 6:
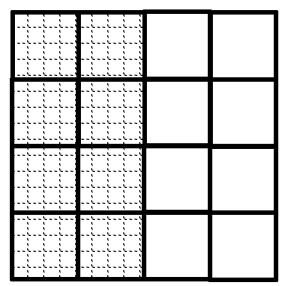
FIG. 6 is an illustration of a garbage collection operation of an embodiment.
Figure 6:
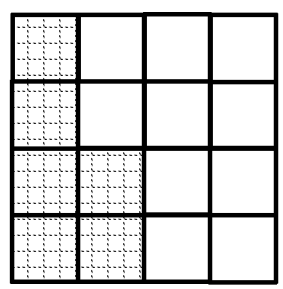
Figure 6:
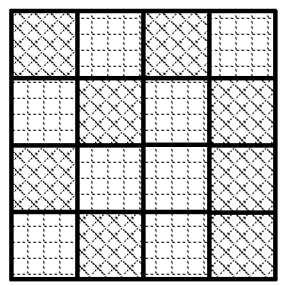
Figure 7:
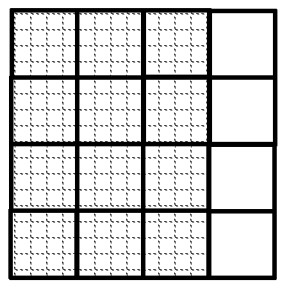
FIG. 7 is an illustration of a garbage collection operation of an embodiment.
Figure 7:
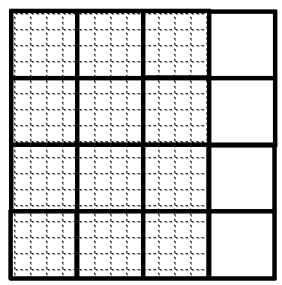
Figure 7:
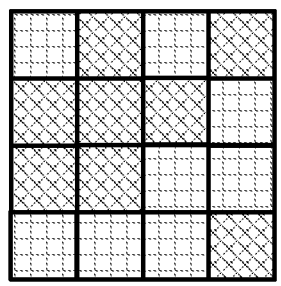
Figure 7:
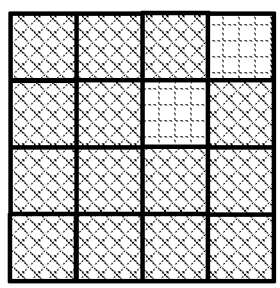

In this example, the controller 102 can assign weightage as following: Data Relocation=60%, EPWR=20%, and GAT Commit=20%. As shown in FIG. 6, the source block with a 50% VFC is picked. The threshold equals the number of sectors written from the host (according to the equation set forth above). On applying the weightage, sectors to be relocated=0.6*threshold (or sectors written from host 300)

Figure 8:
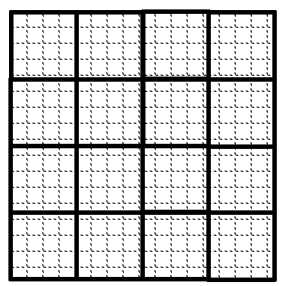
FIG. 8 is an illustration of a garbage collection operation of an embodiment.
Figure 8:
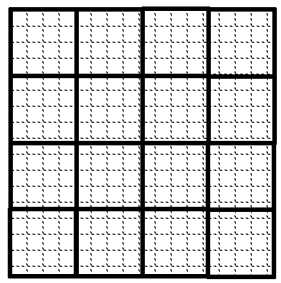
Figure 8:
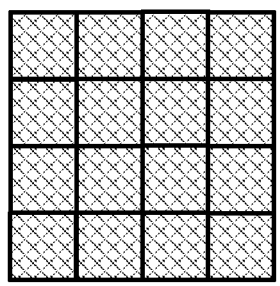
Figure 8:
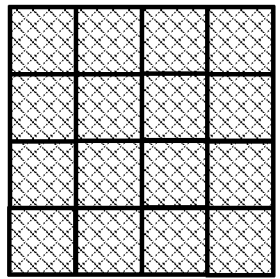
Figure 9:
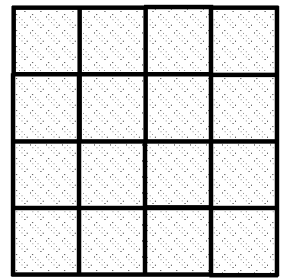
FIG. 9 is an illustration of a garbage collection operation of an embodiment.
Figure 9:
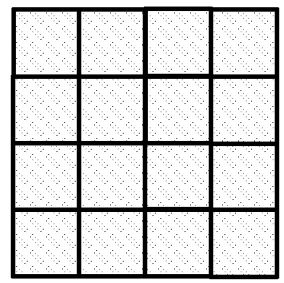
Figure 9:
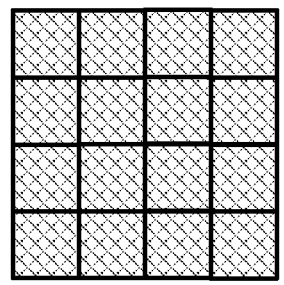
Figure 9:
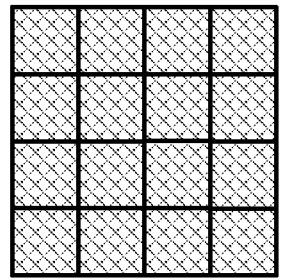
Figure 10:
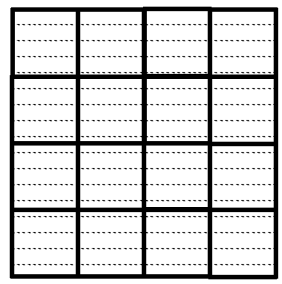
FIG. 10 is an illustration of a garbage collection operation of an embodiment.
Figure 10:
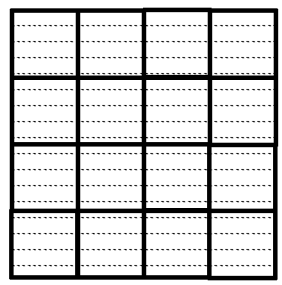
Figure 10:
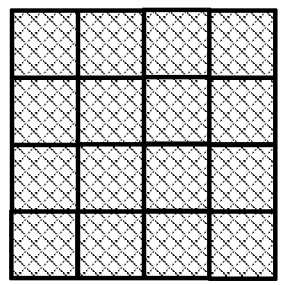
Figure 10:
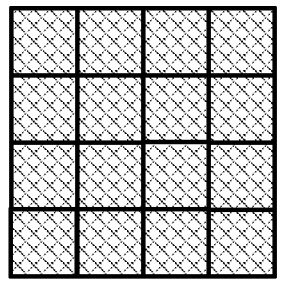

As shown in FIG. 6, the length of an incoming host write is 50% of the block size. Since source block 1 was completely relocated, to fill the destination block, another source block with a 50% VFC is picked, and relocation is started from that block as well (see FIG. 7). FIG. 8 shows the relocation phase being completed, with blocks storing the host and garbage collection blocks being submitted for EPWR. FIG. 9 shows that, after EPWR is completed on both blocks, the host and garbage collection blocks can be submitted for GAT commit. FIG. 10 shows that once GAT commit is completed, both of the garbage collection source blocks (0% VFC) would be released. So, the blocks consumed (for host and garbage collection data) equal the block freed using from garbage collection.

There are several advantages associated with these embodiments. For example, these embodiments can be used to provide better, sustained performance to a data storage device since incoming host data and garbage collection writes are balanced. Also, these embodiments can be scaled to higher memory nodes.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a processor coupled with the memory and configured to:
determine a number of pages of the memory that have been written to by a host;
in response to the number of pages that have been written to by the host being above a first threshold, move a page of data from a source block in the memory to a destination block in the memory as part of a garbage collection operation;
in response to the number of pages in the source block that have been written to by the host being above a second threshold, verify that the page of data from the source block was successfully written to the destination block; and in response to the number of pages in the source block that have been written to by the host being above a third threshold, update a logical-to-physical address map to reflect that the page of data was successfully written to the destination block;

wherein the first, second, and third thresholds comprise different weighted ratios of a valid fragment count in the source block to an invalid fragment count in the source block.

2. The data storage device of claim 1, wherein a number of blocks freed by the garbage collection operation equals a sum of a number of blocks used to store valid data relocated by the garbage collection operation and a number of blocks used to store incoming host data.

3. The data storage device of claim 1, wherein the processor is further configured to determine the different weighted ratios by calculating a quotient of the valid fragment count divided by a difference between a maximum valid fragment count and the valid fragment count.

4. The data storage device of claim 1, wherein a weightage of each weighted ratio is based on an incoming write length of host data.

5. The data storage device of claim 1, wherein a weightage of each weighted ratio is based on block size.

6. The data storage device of claim 1, wherein a weightage of each weighted ratio is based on a configuration of the memory.

7. The data storage device of claim 1, wherein a weightage of each weighted ratio is provided in a configuration file used by the processor.

8. The data storage device of claim 1, wherein the processor is further configured to determine whether to perform the garbage collection operation in response to a number of free blocks in the memory falling below a free block threshold.

9. The data storage device of claim 8, wherein the free block threshold is configurable.

10. The data storage device of claim 1, wherein the memory comprises a three-dimensional memory.

11. The data storage device of claim 1, wherein the processor is part of a memory controller.

12. In a data storage device comprising a memory, a method comprising:

in response to a number of pages in the memory that have been written to by a host being above a first threshold, moving a page of data from a source block in the memory to a destination block in the memory as part of a garbage collection operation;

in response to the number of pages in the source block that have been written to by the host being above a second threshold, verifying that the page of data from the source block was successfully written to the destination block; and in response to the number of pages in the source block that have been written to by the host being above a third threshold, updating a logical-to-physical address map to reflect that the page of data was successfully written to the destination block;

wherein the first, second, and third thresholds comprise different weighted ratios of a valid fragment count in the source block to an invalid fragment count in the source block.

13. The method of claim 12, wherein a number of blocks freed by the garbage collection operation equals a sum of a number of blocks used to store valid data relocated by the garbage collection operation and a number of blocks used to store incoming host data.

14. The method of claim 12, further comprising:

determining the different weighted ratios by dividing the valid fragment count by a difference between a maximum valid fragment count and the valid fragment count.

15. The method of claim 12, wherein a weightage of each weighted ratio is based on an incoming write length of host data.

16. The method of claim 12, wherein a weightage of each weighted ratio is based on block size.

17. The method of claim 12, wherein a weightage of each weighted ratio is based on a configuration of the memory.

18. The method of claim 12, further comprising:

determining whether to perform the garbage collection operation in response to a number of free blocks in the memory falling below a free block threshold.

19. A data storage device comprising:

a memory; and means for:

in response to a number of pages in the memory that have been written to by a host being above a first threshold, moving a page of data from a source block in the memory to a destination block in the memory as part of a garbage collection operation;

in response to the number of pages in the source block that have been written to by the host being above a second threshold, verifying that the page of data from the source block was successfully written to the destination block; and in response to the number of pages in the source block that have been written to by the host being above a third threshold, updating a logical-to-physical address map to reflect that the page of data was successfully written to the destination block;

wherein the first, second, and third thresholds comprise different weighted ratios of a valid fragment count in the source block to an invalid fragment count in the source block.

20. The method of claim 12, wherein the method is performed by a processor in the data storage device.

\* \* \* \* \*